United States Patent
O'Brien et al.

(10) Patent No.: US 9,027,359 B2
(45) Date of Patent: May 12, 2015

(54) HEAT EXCHANGE SYSTEM

(75) Inventors: James O'Brien, Bethesda, MD (US); Matthew Ginalick, Jr., Mount Airy, MD (US)

(73) Assignee: Triea Technologies, LLC, Frederick, MD (US)

( * ) Notice: Subject to any disclaimer, the term of this patent is extended or adjusted under 35 U.S.C. 154(b) by 757 days.

(21) Appl. No.: 12/752,585

(22) Filed: Apr. 1, 2010

(65) Prior Publication Data

US 2011/0041536 A1    Feb. 24, 2011

Related U.S. Application Data

(63) Continuation-in-part of application No. 12/543,268, filed on Aug. 18, 2009.

(51) Int. Cl.

| | | |
|---|---|---|
| F25B 7/00 | (2006.01) | |
| F25D 17/00 | (2006.01) | |
| F25B 39/04 | (2006.01) | |
| F28D 5/00 | (2006.01) | |
| F25B 27/00 | (2006.01) | |
| F25B 30/06 | (2006.01) | |
| F24D 3/08 | (2006.01) | |
| F24D 11/02 | (2006.01) | |
| F24D 19/10 | (2006.01) | |
| F28D 7/02 | (2006.01) | |
| F28D 7/14 | (2006.01) | |
| F28D 20/00 | (2006.01) | |
| F24J 3/06 | (2006.01) | |

(52) U.S. Cl.
CPC ............ *F25B 30/06* (2013.01); *F24D 3/082* (2013.01); *F24D 11/02* (2013.01); *F24D 19/1072* (2013.01); *F24D 2200/12* (2013.01); *F24J 3/06* (2013.01); *F25B 2339/047* (2013.01); *F25B 2400/21* (2013.01); *F25B 2400/24* (2013.01); *F25B 2700/2111* (2013.01); *F25D 2400/12* (2013.01); *F28D 7/022* (2013.01); *F28D 7/14* (2013.01); *F28D 20/0034* (2013.01); *Y02B 30/126* (2013.01); *Y02E 60/142* (2013.01)

(58) Field of Classification Search
USPC ............. 62/175, 335, 305, 235.1, 228.3, 185, 62/201, 181, 183
See application file for complete search history.

(56) References Cited

U.S. PATENT DOCUMENTS

| | | |
|---|---|---|
| 3,935,899 A | 2/1976 | Jolly |
| 4,071,078 A | 1/1978 | Padden |

(Continued)

FOREIGN PATENT DOCUMENTS

WO    WO 8904443 A1 *    5/1989    .............. F25D 17/02

*Primary Examiner* — Cassey D Bauer
*Assistant Examiner* — Joseph Trpisovsky
(74) *Attorney, Agent, or Firm* — Arent Fox LLP (57) ABSTRACT

A modular heat exchange system having a refrigerant system for cycling a refrigerant through a compressor, a condenser, an expansion valve, and an evaporator, a heat source circulation system which circulates a heat exchange fluid between a heat source and the evaporator, a heat sink circulation system which circulates a heat absorption fluid between a heat sink and the condenser, a fluid management system having temperature gauges for respectively reading core temperatures of the heat source and the heat sink, and a thermal energy source from which thermal energy is transferred to the heat exchange fluid when the core temperature of the heat source falls below a threshold temperature while the core temperature of the heat sink is maintained at a constant temperature.

11 Claims, 7 Drawing Sheets

(56) References Cited

U.S. PATENT DOCUMENTS

| | | | |
|---|---|---|---|
| 4,237,859 A | 12/1980 | Goettl | |
| 4,248,292 A * | 2/1981 | Beacham | 165/50 |
| 4,374,467 A * | 2/1983 | Briley | 62/238.1 |
| 4,390,396 A | 6/1983 | Koblenzer | |
| 4,493,193 A * | 1/1985 | Fisher | 62/160 |
| 4,524,759 A * | 6/1985 | Butler | 126/636 |
| 4,569,207 A * | 2/1986 | James | 62/235.1 |
| 4,653,287 A * | 3/1987 | Martin, Jr. | 62/181 |
| 4,679,401 A * | 7/1987 | Lessard et al. | 62/55.5 |
| 4,693,089 A | 9/1987 | Bourne et al. | |
| 4,955,930 A | 9/1990 | Robinson, Jr. | |
| 5,600,960 A * | 2/1997 | Schwedler et al. | 62/99 |
| 5,894,735 A | 4/1999 | Misawa et al. | |
| 6,233,951 B1 * | 5/2001 | Cardill | 62/81 |
| 6,311,506 B1 * | 11/2001 | Takahashi et al. | 62/196.4 |
| 6,405,551 B1 | 6/2002 | Kuwabara | |
| 6,467,289 B2 | 10/2002 | Kuroki et al. | |
| 6,955,065 B2 | 10/2005 | Taylor | |
| 7,021,073 B2 | 4/2006 | Sakakibara | |
| 7,076,964 B2 | 7/2006 | Sakakibara | |
| 2006/0191276 A1 * | 8/2006 | Sienel et al. | 62/238.6 |
| 2008/0006046 A1 | 1/2008 | Slaughter | |

* cited by examiner

HEAT EXCHANGE SYSTEM

CROSS REFERENCE TO RELATED APPLICATION

This is a Continuation-in-Part of application Ser. No. 12/543,268 filed Aug. 18, 2009, now pending. The disclosure of the prior application is hereby incorporated by reference herein in its entirety.

BACKGROUND OF THE INVENTION

1. Field of the Invention

Aspects of the present invention relate to a portable and scalable heat exchange system. More particularly, aspects of the invention relate to a high-efficiency water-to-water heat exchange system for providing an efficient, portable, and/or scalable heating and/or cooling source.

2. Background of the Technology

Figure 1:
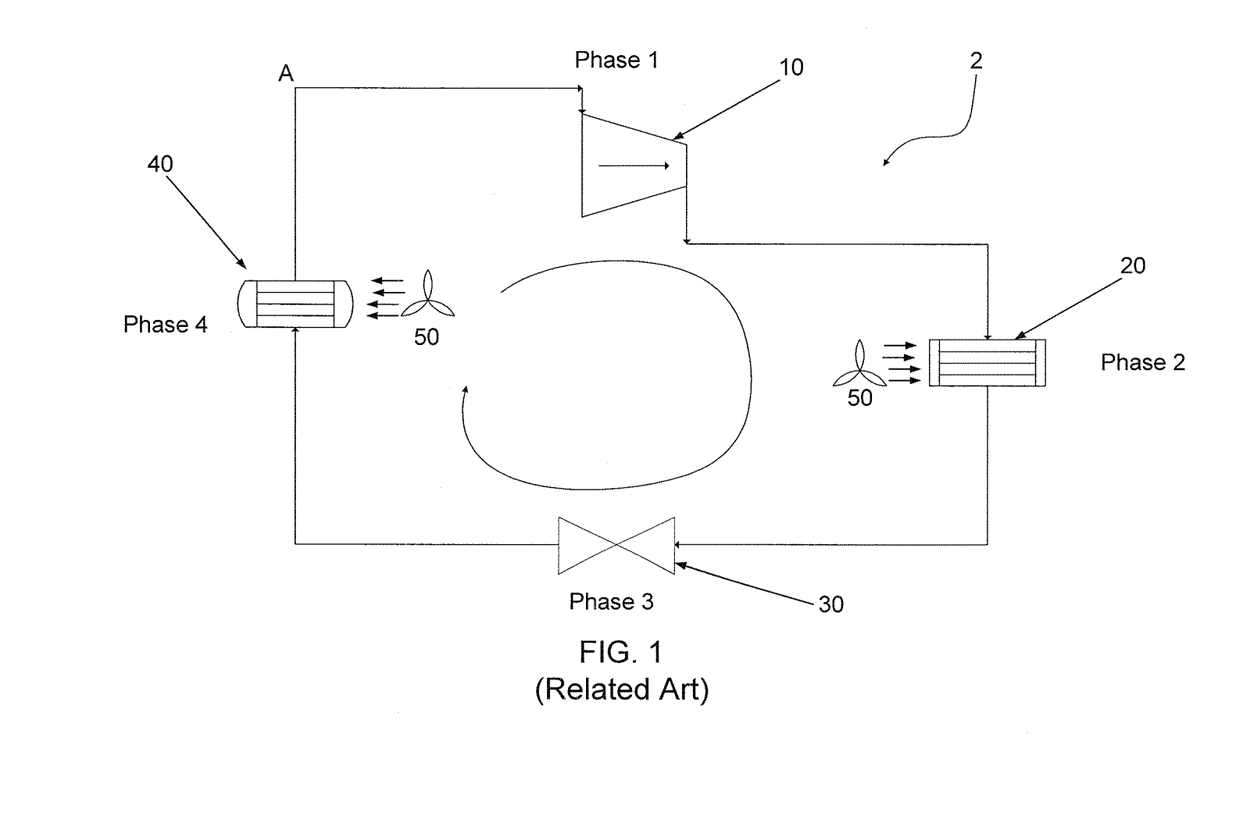
FIG. 1 shows an exemplary vapor-compression cycle as typically used in heat exchange systems.

FIG. 1 shows an exemplary vapor-compression refrigeration cycle 2 used in many heat exchange systems, in which a refrigerant is circulated through a closed-loop compression and expansion cycle. As shown in FIG. 1, the refrigerant begins as a vapor at point A. During Phase 1 of the cycle, the refrigerant vapor is compressed and circulated by a compressor 10, resulting in a high-pressure, high-temperature refrigerant vapor. The electro-mechanical energy of the compressor 10 is also converted into heat energy carried by the refrigerant vapor, which exits the compressor 10 as a superheated vapor. During Phase 2 of the cycle, the superheated vapor passes through a condenser 20 where a heat exchange process pulls heat energy from the superheated vapor, causing the refrigerant to condense into a high-pressure liquid. As shown at Phase 3 of the cycle, the hot liquid refrigerant is then directed through a thermal expansion valve 30, which meters the flow of refrigerant to the evaporator 40 and usually results in a flash lowering of the pressure and temperature of the condensed hot liquid refrigerant. As a result, the low-pressure, low-temperature liquid or saturated liquid/vapor refrigerant enters the evaporator 40 during Phase 4 of the cycle, wherein a second heat exchange process draws heat energy from a heat source, such as water or air, to the refrigerant, causing the refrigerant to reach a saturation temperature and returning the refrigerant to the vapor state at point A. The cycle is repeated.

In many conventional residential heat pump systems, for example, for supplying heat, the heat exchanging condenser 20 extracts heat energy from the superheated refrigerant vapor during Phase 2 of the cycle by using a blower 50 to direct cool air across condenser coils carrying the hot vapor (see FIG. 1). The cool air conducts heat energy from the coils and the heated air is supplied by the blower through ducting, for example, to directly heat the home or residence. The evaporator, on the other hand, typically relies on the air temperature outside the home for drawing heat into the refrigerant during Phase 4 of the cycle.

For supplying cool air, the blower 50 may instead be used to direct hot air across evaporator coils carrying the cooler fluid refrigerant during Phase 4 of the cycle 2. The cooler fluid refrigerant conducts heat energy from the hot air, and the resulting cooler air may be supplied to the home. Under such circumstances, the condenser 20 relies on the outside air to cool the superheated vapor during Phase 2 of the vapor-compression cycle 2

In some conventional systems, the heat pump may be designed with a reversible valve and specialized heat exchangers, for example, allowing the vapor-compression cycle 2 to operate in either direction, with each heat exchanger serving as either a condenser or an evaporator. The cycle of the heat pump can thus be reversed, so that, depending on the desired climate, a single blower may be used to direct hot or cool air across coils, for example, carrying the cooler refrigerant fluid or the superheated refrigerant vapor, respectively.

A typical air-source heat pump, as described above, works harder to transfer heat from a cooler place to a warmer place as the temperature difference increases between the cooler and warmer places. Accordingly, the performance of an air-source heat pump deteriorates significantly, for example, during the winter months in a very cold climate, as the temperature difference between the air outside a home becomes significantly less than the desired temperature inside the home.

Figure 2:
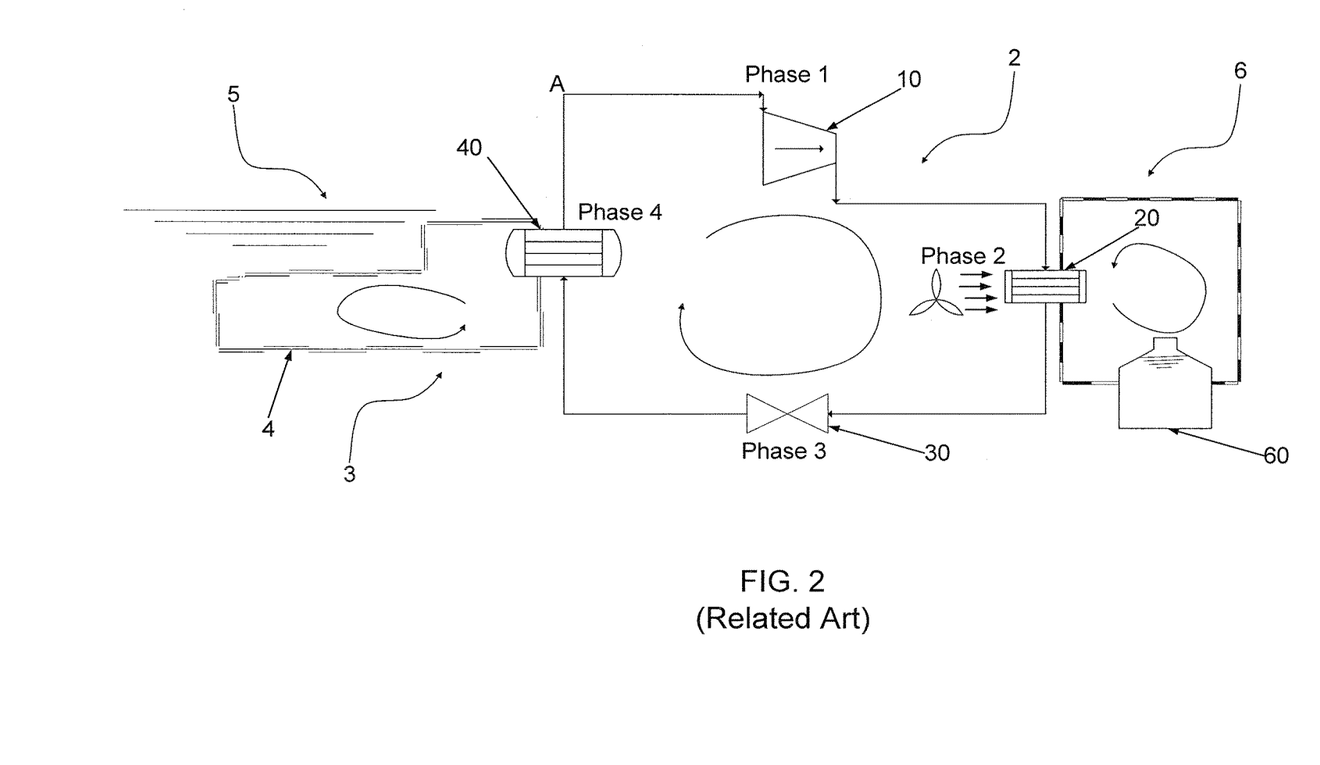
FIG. 2 shows an exemplary ground source heat pump system as is known in the prior art.

A ground source heat pump system, which typically extracts heat from the ground, or a body of water, may be used to counteract the effect of significant temperature gradients between the heat source and the heat sink. This is because the ground below a certain depth, and water below a certain level, maintains a fairly constant temperature year round, leading to generally lower temperature differentials throughout significant periods of the year, allowing for increased performance of the heat pump. As shown in FIG. 2, the vapor-compression cycle 2 described in FIG. 1 may be coupled with a ground source loop 3 that carries a heat exchange fluid, such as water, for example. The heat exchange fluid conducts heat while flowing through conduits 4 buried in the ground or sunk under a body of water 5. A portion of the heat carried by the heat exchange fluid in the conduits 4 is transferred to the cooler liquid refrigerant by conduction through a heat exchange process performed by the evaporator 40 during Phase 4 of the vapor-compression cycle 2. The refrigerant is vaporized, and the refrigerant vapor is then compressed during Phase 1 of the vapor-compression cycle. As described previously, a blower 50 may be used to direct cool air across condenser coils while carrying the hot vapor during Phase 2 of the vapor-compression cycle 2 in order to provide heat to the interior of a structure. Additionally, a heat sink loop 6 may be coupled with the condenser 20 to capture heat transferred from the heat exchange fluid during Phase 4 of the vapor-compression cycle 2, along with heat that is added through the electro-mechanical energy input by the compressor 10 during Phase 1 of the vapor-compression cycle 2, into a heat sink 60, which could be a tank of hot water, for example. The condensed refrigerant exiting the condenser 20 is then expanded during Phase 3 of the vapor-compression cycle 2 and the cooler refrigerant liquid enters the evaporator 40 once again to draw more heat from the heat exchange fluid flowing through the ground source loop 3.

A typical ground source system, such as the ground source loop 3 described above, is expensive to construct and can be extremely disruptive to install because thousands of feet of piping may need to be placed in horizontally dug trenches or wells dug vertically deep into the ground, to effectively tap into the thermal energy contained therein. And although the thermal conductivity of water is greater than that of the ground, generally allowing for less piping to be placed into a body of water, access to a body of water close enough to the home for the purpose of creating a ground source system is often unfeasible.

There exists a need for a heat exchange system which combines the efficiencies of the thermal conductivity of a fluid, such as water and a specially tuned vapor-compression cycle to produce an efficient, portable, and scalable heat exchange system for simultaneously providing heating and/or cooling.

SUMMARY OF THE INVENTION

Aspects of the present invention provide for a heat exchange system that combines a thermally conductive fluid and a specially tuned vapor-compression cycle in an extremely efficient, modular, portable, and scalable system for providing superior heat exchange capabilities for heating and/or cooling in almost any environment. As a result, the heat exchange system in accordance with aspects of the present invention may be disassembled and assembled with ease and without causing damage to the structural components of the system to permit convenient installation in residential, commercial and industrial settings. Aspects of the present invention include operation of the system using a portable generator, allowing deployment in remote locations, such as forward operating military outposts, or to provide heating, cooling, hot water and chilled water to people in need around the world, such as victims in disaster relief centers and in refugee camps.

Aspects of the invention, and, in particular, the increased performance of the efficiently designed heat exchange system, including an automated water management system, permit enhanced heating and cooling while creating a significantly reduced footprint on the environment over conventional heating and cooling systems that rely on fossil fuels to function.

Additional advantages and novel features of aspects of the invention will be set forth in part in the description that follows, and in part will become more apparent to those skilled in the art upon examination of the following or upon learning by practice of the invention.

DETAILED DESCRIPTION

Figure 3:
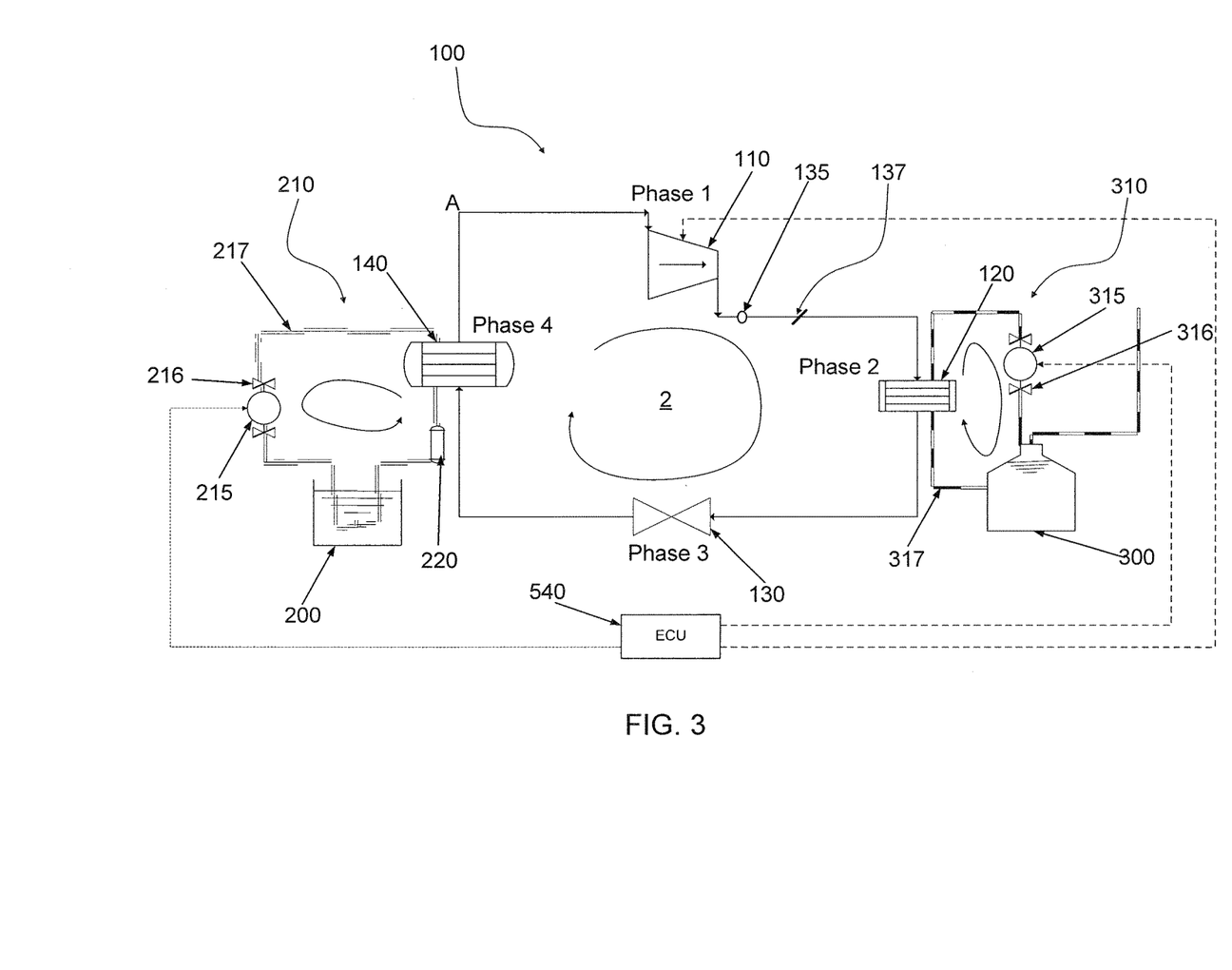
FIG. 3 shows a system flow diagram of a heat exchange system, in accordance with aspects of the present invention.

FIG. 3 is an exemplary flow diagram in accordance with aspects of the present invention. The heat exchange system 100 comprises a vapor-compression refrigeration cycle having a compressor 110, a condenser 120, an expansion valve 130, and an evaporator 140. Although many different refrigerants may be used, the refrigerant R-410A, a mixture of difluoromethane and pentafluoroethane, is preferred for its thermodynamic properties and because R-410A does not contribute to ozone depletion. As will be described in further detail, R-410A typically operates at higher pressures than most refrigerants, requiring increased strength in certain components of the system.

Figure 4:
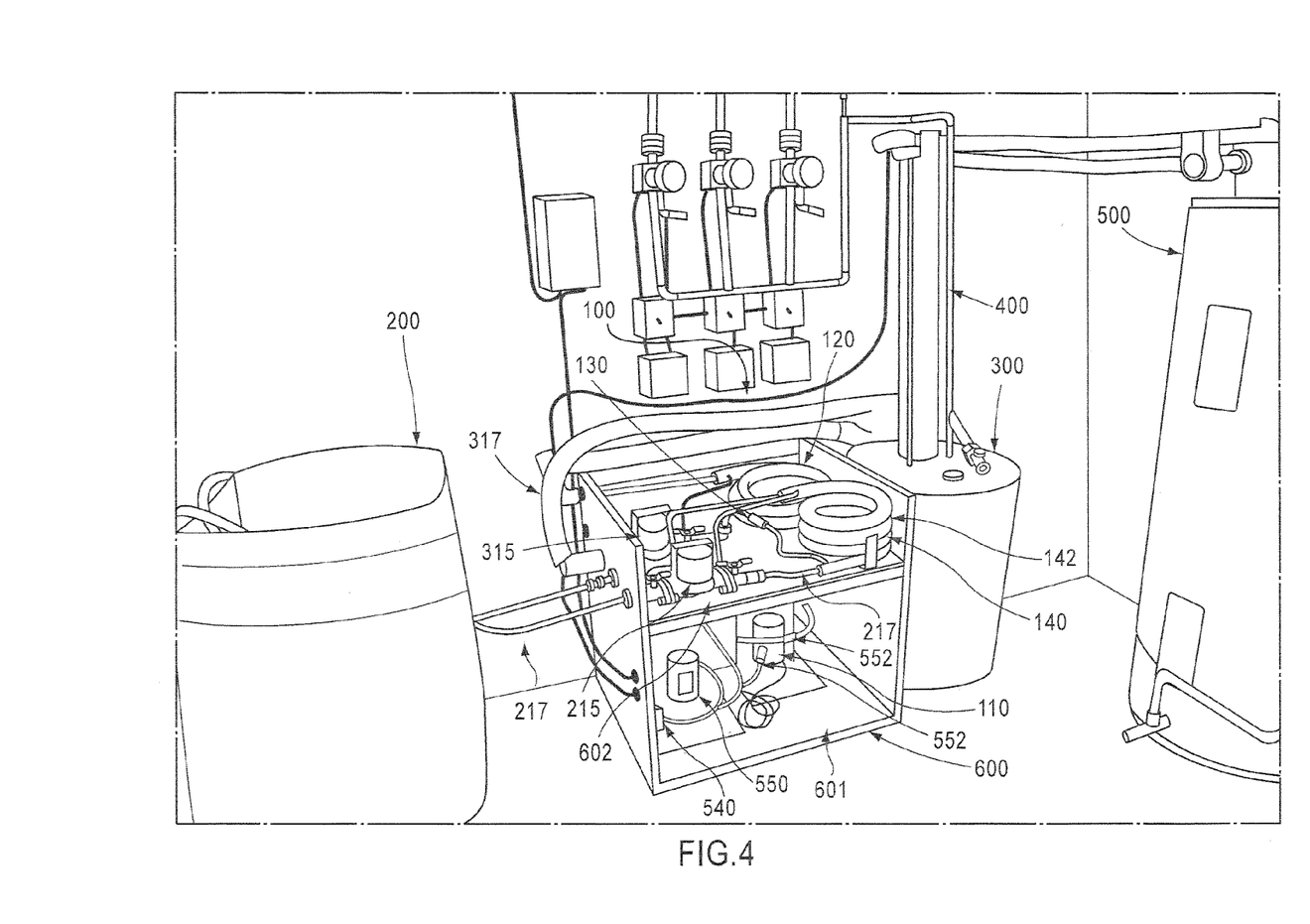
FIG. 4 shows a perspective view of an exemplary heat exchange system, in accordance with aspects of the present invention.

As shown in FIGS. 3 and 4, a heat source 200, such as a tank of water, may be provided to work in tandem with the heat exchange system 100 to supply heat energy during Phase 4 of the vapor-compression cycle 2. The heat source 200 may alternatively be a nearby lake or stream, for example. The heat source 200 may be connected to the heat exchange system 100 through a circulation system 210, which may be a closed-loop or open-loop system for circulating a heat exchange fluid, such as water. The circulation system 210 may include a pump 215, for example, for circulating the heat exchange fluid from the heat source 200, through the evaporator 140 and back to the heat source 200. Fluid flow valves 216, such as ball or butterfly valves, may be installed on either side of the pump 215, to allow for fluid flow to the pump 215 to be shut off during assembly, or during repair and/or replacement of the pump 215. Fluid flow conduits 217 for carrying the heat exchange fluid 205 through the circulation system 210 may include rigid and/or flexible tubing made of a thermally conductive material, such as copper or a modified polyethylene, for example. As shown in FIG. 4, the fluid flow conduits 217 may include flexible tubing exterior to the heat exchange system 100, copper or brass tubing, for example, inside of the heat exchange system 100, and hard plastic tubing, for example, to form a coiled section of the evaporator 140.

Figure 5:
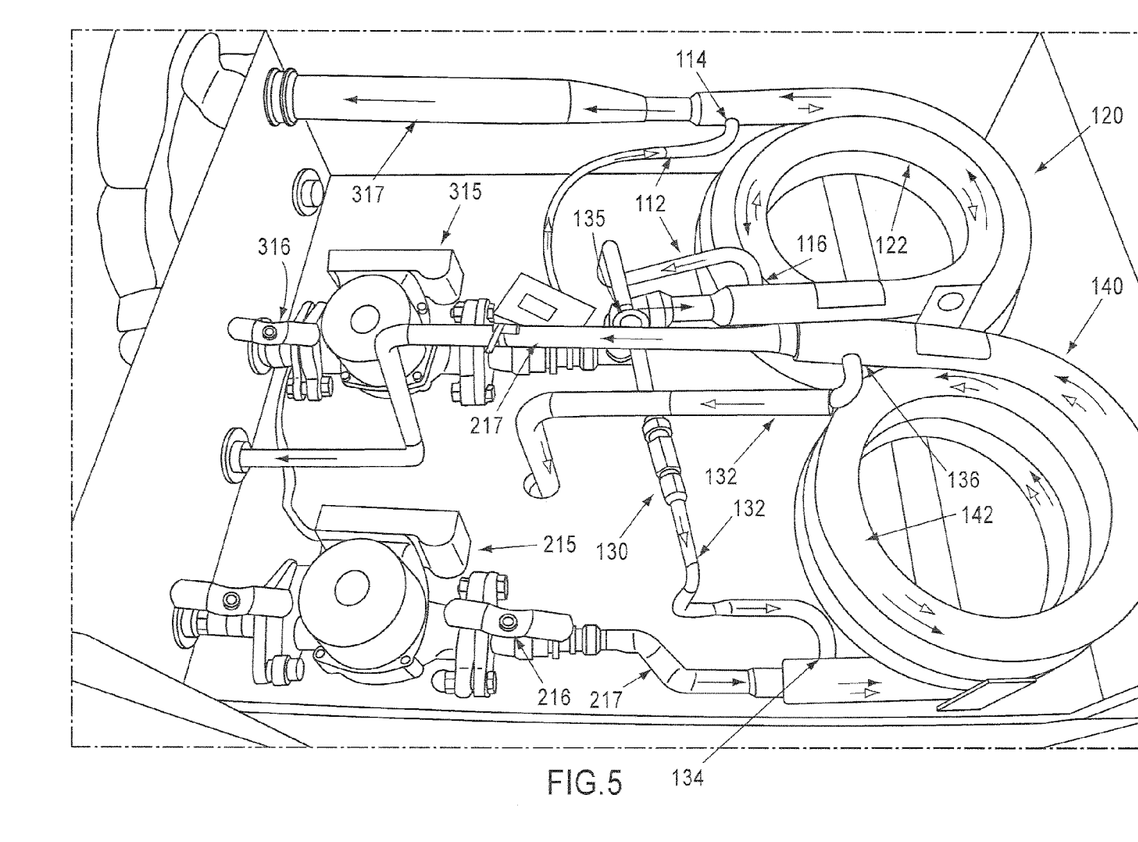
FIG. 5 shows an enlarged view of various components of the exemplary heat exchange unit, in accordance with aspects of the present invention.

As indicated by the longer arrows in the enlarged view of FIG. 5, the heat exchange fluid 205 is forced by the pump 215 to flow through the stacked coil section 142 of the evaporator 140 in a specified direction. The heat exchange function of the evaporator 140 is accomplished by concurrently running a cold refrigerant conduit 132, which exits the expansion valve 130, through the stacked coil section 142 of the evaporator 140. The cold refrigerant conduit 132 enters the evaporator 140 at an evaporator entrance junction 134 and exits the evaporator at an evaporator exit junction 136. The cold refrigerant conduit 132 follows, and is contained within, the stacked coil section 142 of the evaporator 140. The cold refrigerant conduit 132 is ideally situated to permit the entire outer surface area of the cold refrigerant conduit 132 to be in direct contact with the warmer heat exchange fluid 205 flowing through the stacked coil section 142. Accordingly, increased thermal conduction from the heat exchange fluid during Phase 4 of the vapor-compression cycle 2 is provided by the afore-mentioned arrangement of the structural components.

As shown in FIG. 5, the refrigerant flow entering the evaporator 140 has just completed Phase 3 of the vapor-compression cycle, in which the hot refrigerant fluid has passed through the expansion valve 130 and experienced a rapid decrease in pressure and temperature. As shown with the smaller arrows in FIG. 5, the cooler refrigerant fluid flows through the cold refrigerant conduit 132 in the same direction as the warmer heat exchange fluid flows through the stacked coil section 142 of the evaporator 140. The concurrent tubular flow creates a variable temperature gradient over the length of the stacked coil section 142, in which the refrigerant absorbs the heat energy of the heat exchange fluid at a greater rate nearer the evaporator entrance junction 134 than towards the evaporator exit junction 136. The cold refrigerant conduit 132 follows, and is contained within, the stacked coil section 142 of the evaporator 140. The refrigerant and the heat exchange fluid both approach an equilibrium temperature as the fluids flow in parallel through the respective conduits in the evaporator 140. The refrigerant has thus completed Phase 4 of the vapor-compression cycle, and, as a vapor, is now ready to enter the compressor 110.

As shown in FIGS. 3 and 4, the compressor 110, which may be a reciprocating or scroll compressor, for example, supplies the electro-mechanical energy to compress the vapor into a superheated vapor during Phase 1 of the vapor-compression cycle 2. A heat sink 300, such as a tank of water, may be provided to work in tandem with the heat exchange system 100 to store the amplified heat energy extracted from the heat exchange fluid during Phase 4 of the vapor-compression cycle 2. The heat sink 300 may be connected to the heat exchange system 100 through a heat sink circulation system 310, which may be a closed-loop or open-loop system for circulating a heat absorption fluid 305, such as water. The heat sink circulation system 310 may include a pump 315, for example, for circulating the heat absorption fluid from the heat sink 300, through the condenser 120 and back to the heat sink 300. Fluid flow valves 316, such as ball or butterfly valves, may be installed on either side of the pump 315, to allow for fluid flow to be shut off to the pump 315 during assembly, or during repair and/or replacement of the pump 315. Fluid flow conduits 317 for carrying the heat absorption fluid through the heat sink circulation system 310 may include rigid and/or flexible tubing made of a thermally conductive material, such as copper or a modified polyethylene, for example. As shown in FIG. 4, the fluid flow conduits 317 may include rigid copper tubing, for example, insulated to protect heat loss during circulation of the heat absorption fluid through the heat sink circulation system 310.

As indicated by the longer arrows in the enlarged view of FIG. 5, the heat absorption fluid is forced by the pump 315 to flow through the stacked coil section 122 of the condenser 120 in a specified or predetermined direction. The heat exchange function of the evaporator 120 is accomplished by concurrently running a hot refrigerant conduit 112, which exits the compressor 110, through the stacked coil section 122 of the condenser 120. The hot refrigerant conduit 112 enters the condenser 120 at a condenser entrance junction 114 and exits the condenser at a condenser exit junction 116. The hot refrigerant conduit 112 follows, and is contained within, the stacked coil section 122 of the condenser 120. The hot refrigerant conduit 112 is ideally situated to permit the entire outer surface area of the hot refrigerant conduit 112 to be in direct contact with the cooler heat absorption fluid flowing through the stacked coil section 122 of the condenser 120. This enables increased thermal conduction from the superheated refrigerant vapor during Phase 2 of the vapor-compression cycle 2.

As shown in FIG. 5, the refrigerant flow entering the condenser 120 has just completed Phase 1 of the vapor-compression cycle, in which the refrigerant vapor was compressed by the compressor 110 and experienced a rapid increase in temperature. As shown with the smaller arrows in FIG. 5, the superheated refrigerant vapor flows through the hot refrigerant conduit 112 in an opposite direction relative to the cooler heat absorption fluid flowing through the stacked coil section 122 of the condenser 120. The countercurrent tubular flow maintains a nearly constant temperature gradient over the length of the stacked coil section 122, in which heat is conducted from the superheated refrigerant vapor into the cooler heat absorption fluid at nearly the same rate near the condenser entrance junction 114 as at the condenser exit junction 116. Particularly with the use of water as the heat absorption fluid, for example, which has a relatively high thermal conductivity, the countercurrent flow in the condenser 120 allows efficient transfer of a substantial portion of the heat energy drawn from the heat exchange fluid, as well as the work energy input from the compressor 110, into the heat sink 300.

In accordance with aspects of the present invention, a second condenser (not shown) may be provided between the condenser 120 and the expansion valve 130. In this region of the refrigeration cycle, sometimes referred to as the sub cool region, the refrigerant may still retain a certain amount of thermal energy that was not transferred to the heat absorption fluid during the exchange process in the first condenser 120. Accordingly, the second condenser may be provided to draw additional thermal energy from the refrigerant into a fluid that may be circulated back to the heat source 200. The warm fluid may thus transfer the additional thermal energy back into the heat source 200 for storage and further use as described above.

The heat exchange system of the present invention draws on the thermal energy contained in the heat source 200, which may be a tank of water at ambient temperature, for example, and by way of the vapor-compression cycle 2, deposits the withdrawn thermal energy efficiently into the heat sink 300, which may be another tank of water, for example. The heat sink 300 may thus reach temperatures of more than 150° F. As shown in FIG. 4, the hot water in the heat sink 300 may be drawn and pumped through pipes 400 to a radiant heating system, for example, or a hydronic coil and blower arrangement that is connected to a ducting system, in order to provide a constant and efficient source of heat for the interior of a structure. In addition, a domestic hot water storage tank 500 may be connected to the heat sink 300 to heat exchange thermal energy into the hot water storage tank 500 for potable water use.

Figure 6:
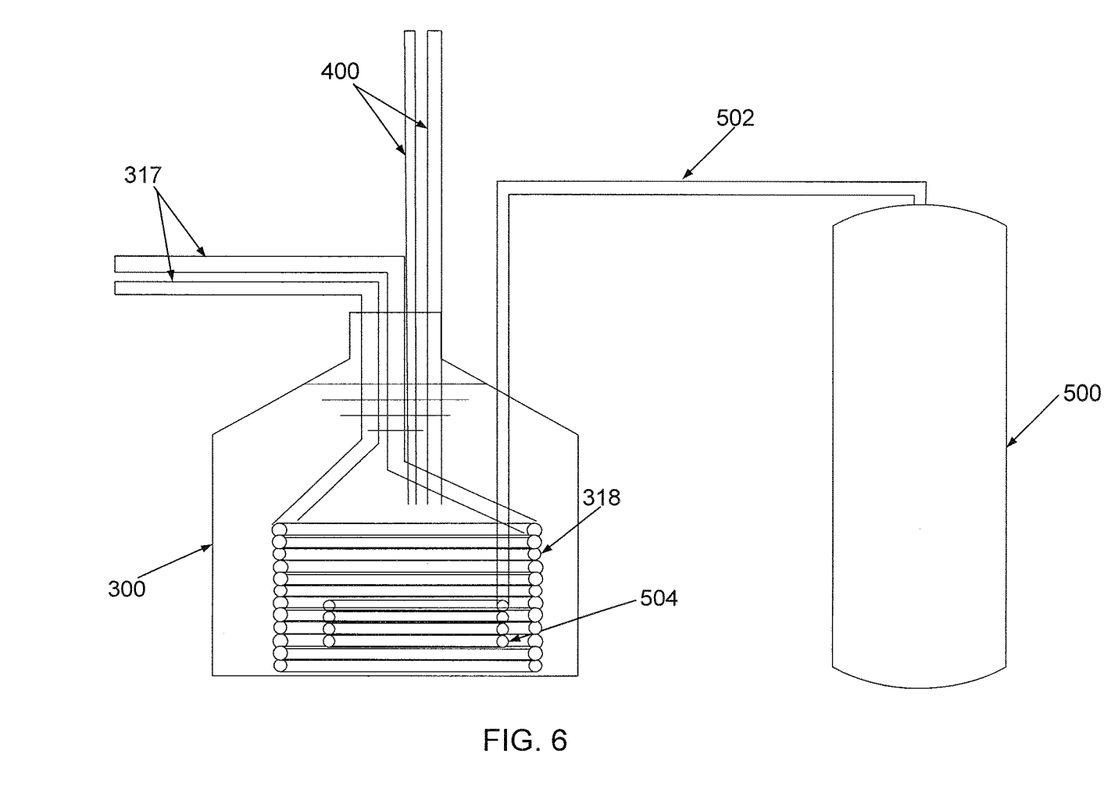
FIG. 6 shows a cutaway view of an exemplary heat sink, in accordance with aspects of the present invention.

FIG. 6 shows an enlarged cutaway view of an exemplary heat sink 300 in accordance with aspects of the present invention. The fluid flow conduits 317, which may be wrapped in insulating material to prevent the escape of thermal energy to the environment, may run from the heat sink 300 to the heat exchange system 100 and back to complete a closed loop, for example. Additionally, a heat exchange coil 318, comprised of copper, or any other suitable material having high thermal conductivity, may be provided inside the heat sink 300 to facilitate heat exchange from the hot water in the fluid flow conduits 317 into the heat sink 300. The hot water may then be drawn into the pipes 400 to supply a radiant heating system, for example.

As shown in FIG. 6, the domestic hot water storage tank 500 may connect to the heat sink 300 by pipes 502, which may be insulated, to conduct heat from the hot water in the heat sink 300 by way of heat exchange coils 504, also placed in the heat sink 300. As such, the domestic hot water system may be completely separate from the heat sink circulation system 310, the efficient heat exchange system thus providing the thermal energy for potable hot water use in a safe and cost-effective manner.

As shown in FIGS. 3 and 4, in accordance with aspects of the present invention, an electronic control unit (ECU) 540 may be provided to control operation of the compressor 110 and the circulation pumps 215 and 315. The ECU 540 may operate with one or more thermostats, for example, to maintain the system in an efficient operating range. For instance, the ECU 540 may set the compressor 110 and the circulation pumps 215 and 315 to run if the temperature of the water in the heat sink 300 drops below a certain efficiency threshold temperature, for example, or alternatively, if the temperature of the water in the heat source 200 rises above a certain efficiency threshold temperature. In another aspect of the present invention, as shown in FIG. 3, a thermal energy source 220 may provide supplemental thermal energy to the heat source cycle when a temperature gauge in the heat source 200 indicates to the ECU 540 that the temperature of the heat source 200 has dropped below a predetermined efficiency threshold. The thermal energy source 220 may be any suitable source for heating the heat exchange fluid 205, such as a conventional hot water heating element of a predetermined wattage, for example, placed within the fluid flow conduit 217. Other exemplary thermal energy sources in accordance with aspects of the present invention may include the abundant heat sources in restaurants from which the thermal energy can be drawn upon and deposited, through heat exchangers, for example, into the heat source 200. Using a hydronic coil, piping and pumps, for example, the heat retained in the elevator penthouses of buildings can be transferred into the heat source cycle. Any ready source of heat that can be practically transferred into the heat source 200 may be used as the thermal energy source 220, including "hot spots" found in swimming pools, drain pipes, transformer rooms, data centers, computer rooms, and the upper space in certain high-ceiling rooms, to name just a few. The techniques to capture and transfer the thermal energy from a thermal energy source 220 may typically include hydronic systems, but any suitable method of transferring thermal energy from a secondary source of heat to the heat source 200 is contemplated herein.

As shown in FIG. 4, in accordance with aspects of the present invention, the heat exchange system 100 may be fitted with an electronic pressure control unit 550. In combination with one or more pressure transducers 552, the electronic pressure control unit 550 may be set up to monitor the sensed pressure at any point in the system, including the intake (suction) pressure and the discharge (head) pressure of the compressor 110. Accordingly, measurement of the evaporator pressure and/or the condenser pressure can provide valuable insight into the efficiency of the system and whether the refrigerant charge is too low or excessive, for example. As shown in FIGS. 3 and 5, a sight glass 135 may also be used to aid in the inspection of the refrigerant charge level, as bubbles in the line generally indicate an undercharge. The sight glass 135 is preferably located on the high-pressure liquid side of the compressor 110. In another aspect of the present invention, as shown in FIG. 3, a filter drier 137 may be installed in the refrigerant path, preferably on the high-pressure liquid side of the compressor 110, to adsorb unwanted moisture in the refrigerant cycle.

According to aspects of the present invention, the refrigerant charge in the vapor-compression cycle 2 may be precisely determined in accordance with a length of the refrigerant run and the desired characteristics of a well-balanced heat exchange system. The R-410A refrigerant charge may be intentionally set to a level that allows the system to continue to operate at maximum efficiency, while increasing the discharge temperature of the superheated vapor discharged from the compressor 110. The unexpected results of the present invention call for a substantially lower refrigerant charge than normal to achieve the desired results of an efficient heat transfer between the heat source 200 and the heat sink 300.

The use of R-410A enhances the ability to increase the temperature on the discharge side of the compressor 110, but requires much higher pressures to operate compared to previously used refrigerants. For example, to achieve a condensing temperature value of 140°, an R-410 high-side pressure must approach 550 psi. In other words, for the heat absorption fluid running through the condenser coil section 122, which is generally maintained at a temperature of 140° or higher, to condense the superheated vapor of the refrigerant in the conduit 116, the pressure on the condenser side of the heat exchanger must approach 550 psi or higher. By using a scroll compressor 110 rated to handle 650 psi before disengaging, and using tubes and fittings rated to withstand the elevated temperatures and pressures of an R-410A charged system, the heat exchange system 100 can handle the higher pressures required to produce the higher compressor discharge temperatures necessary to ensure heat exchange occurs in the condenser at temperatures above 140° F.

As heat energy is transferred from the heat source 200 to the heat sink 300, the temperature of the heat source 200 lowers. Depending on the heat load demand, and the size of the body of water, for example, that is serving as the heat source 200, the temperature of the heat source 200 may drop significantly. Due to the parallel, concurrent tubular flow design of the evaporator 140, and the ability to generally maintain the heat source 200 in an ambient environment, the liquid refrigerant typically draws enough latent heat to effectively boil the liquid refrigerant and deliver vapor with enough pressure to the compressor 110 to function highly efficiently. In fact, a slight lowering of the refrigerant charge so that the intake side pressure is slightly lowered, while still preventing liquid refrigerant from being delivered to the compressor 110, may slightly elevate the compression ratio of the compressor 110. The higher compression ratio in turn may transfer more compression energy to the refrigerant during compression resulting in an even higher discharge temperature so that the heat absorption fluid can be heated to even higher temperatures The colder heat source 200 may also be used as a cooling medium for chilling water or providing cool air by employing the same water-to-water or water-to-air heat transfer means discussed above with respect to the hot water side. For example, hydronic coils, which draw upon the cold water created in the heat source 200, may be used in combination with a fan to blow hot air across the hydronic coils to produce cooler air for the air conditioning of a particular structure. Similarly, as in the case of a domestic hot water tank, a separate cold water heat exchange system and storage tank, for example, can provide chilled water for a variety of uses.

Features in accordance with aspects of the present invention include configuring the components of the heat exchange system 100 to be compact, modular and/or portable, for example. As shown in FIG. 4, a housing unit 600 may have multiple shelves 601 and 602 for vertically stacking and/or creating compartments for the storage and mounting of the various components of the heat exchange system 100, such as the compressor 110, the condenser 120, the expansion valve 130, and the evaporator 140. Various quick install features may be included to enable the easy installation and/or disassembly of the heat source 200 and/or the heat sink 300, including hose bibs (not shown), for example, for quickly connecting/disconnecting the fluid flow conduits 217 and 317 to the heat exchange system 100. Mounting brackets may be provided to allow for quick and efficient mounting of the various components, such as the compressor 110, the condenser 120, the evaporator 140 and the circulation pumps 215 and 315. Rubber padding, insulation, panels, doors and/or a cover may be provided that permit easy assembly/disassembly and access to the interior components for maintenance, while reducing the vibration, sound and heat loss that may be generated during operation of the heat exchange system 100. The housing unit 600 may be provided with a surface for mounting an integrated electric panel. As such, the heat exchange system may be prewired and ground to the integrated electric panel to provide a single, efficient connection to an external power source. Light Emitting Diode (LED) panels may be mounted to the housing unit to provide visible operational feedback to an observer with respect to various aspects or components of the heat exchange system 100.

By maintaining the modularity and portability of the heat exchange system 100, the unit 100 may be transported to and employed easily in remote locations. A generator may be used for producing the electricity needed by the compressor 110 and the circulation pumps 215 and 315, and access to a water source may provide both a heat source 200 and a heat sink 300 for heating and cooling purposes.

Figure 7:
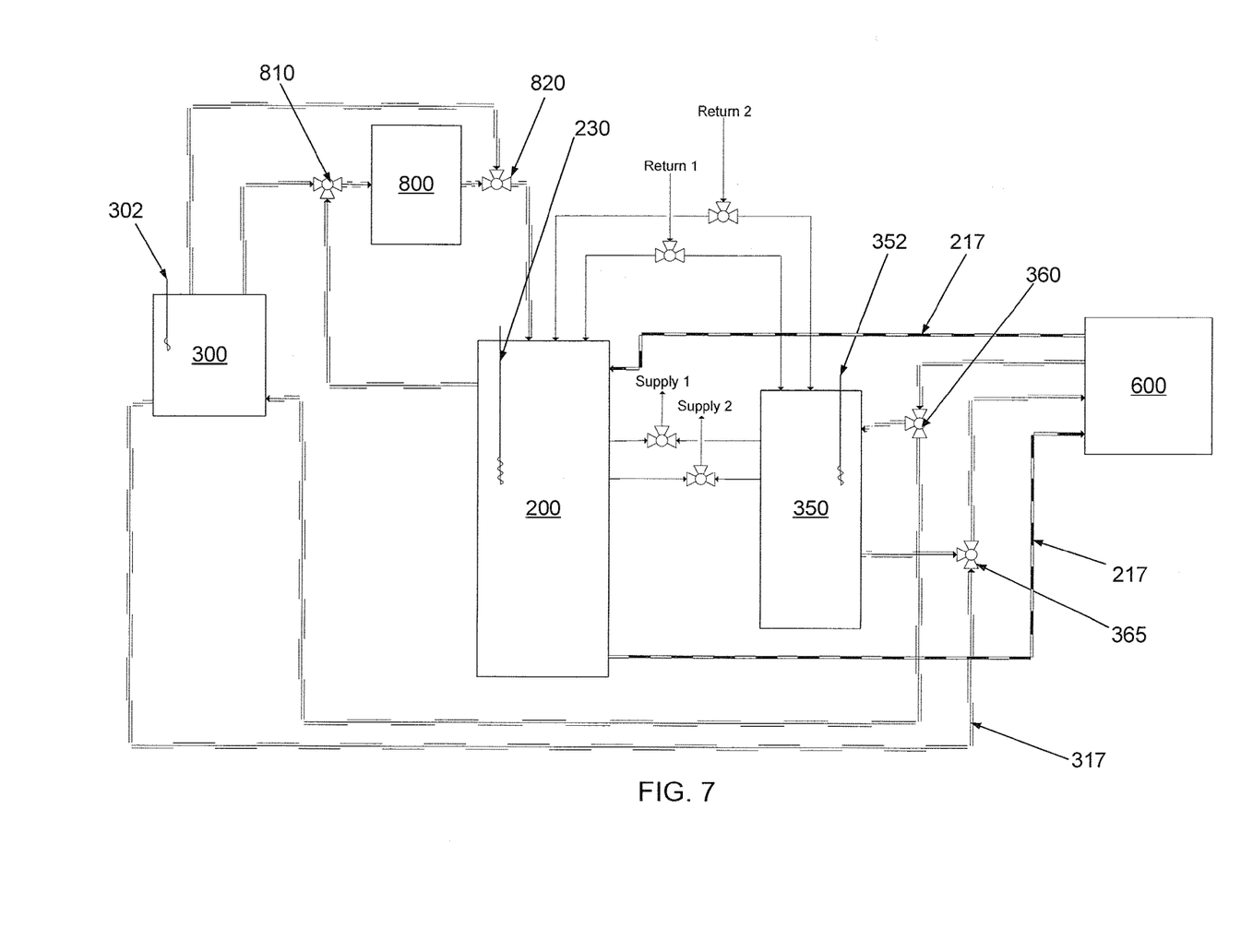
FIG. 7 is a system flow diagram of an exemplary fluid management system.

FIG. 7 depicts aspects of an exemplary fluid management system 700 in accordance with the present invention that may be integrated with various aspects the heat exchange system 100 to provide precision balance and control for efficiently managing the varying heating and cooling load demands for an enclosed structure, for example. The housing unit 600 may house the primary components of the vapor compression cycle 2, such as the compressor 110, the condenser 120, the expansion valve 130, the evaporator 140, the pumps 215 and 315, and/or the ECU 540. The heat source circulation system 210 includes the heat source 200, which may be a 225 gallon water tank, for example, connected to the evaporator 140 in the housing unit 600 by fluid flow conduits 217. The heat sink circulation system 310 includes the heat sink 300, which may be a 55 gallon water tank, for example, connected to the condenser 120 in the housing unit 600 by fluid flow conduits 317. The heat sink circulation system 310 may include a secondary heat sink 350, which may be a 160 gallon water tank, for example, also connected to the condenser 120 in the housing unit 600. Three way valves 360 and 365 may be provided to control the fluid flow between the primary and secondary heat sinks, 300 and 350 respectively. The valves 360 and 365 are controlled to operate in tandem so that when the valve 360 shuts off fluid flow in the direction of the heat sink 300 and instead directs the fluid flow to the secondary heat sink 350, the valve 365 opens to receive the fluid flow from the secondary heat sink 350 and is closed to receiving fluid flow from the heat sink 300. Similarly, when the valve 360 shuts off the fluid flow in the direction of the secondary heat sink 350 and instead directs the fluid flow to the heat sink 300, the valve 365 opens to receive the fluid flow from the heat sink 300 and is closed to receiving fluid flow from the secondary heat sink 350. In this manner, the heat exchange system 100 may select either the heat sink 300 or the secondary heat sink 350 into which to deposit the thermal energy drawn from the heat source 200.

The components of the fluid management system 700, in conjunction with the components of the heat exchange system 100, must be sized appropriately to achieve a symbiotic balance between the thermal mass of the heat sinks 300 and 350, any associated hot side heat exchange systems, the thermal mass of the heat source 200, and any associated cold side heat exchange systems, while accommodating the varying heating and cooling load demands. Factors such as ambient outdoor temperatures during summer and winter months, construction materials used for building the structure, including insulation and windows, and the habits of inhabitants or tenants, for example, may have a large impact on the various system configurations used to calibrate the heat exchange system in response to the required heating and cooling load demands.

As shown in FIG. 7, a heat source temperature gauge 230 may be provided to monitor a core temperature of the heat source 200. Similarly, temperature gauges 302 and 352 may be provided to respectively monitor core temperatures of the heat sink 300 and the secondary heat sink 350. The various temperature gauges 230, 302 and 352 may communicate with the ECU 540 by a set of relay switches, or any suitable circuit devices, including wireless thermostats, for example.

In this manner, the fluid management system 700 operates in balanced synchronization with the heat exchange system 100 by monitoring the core temperatures of the heat source 200 and the heat sinks 300 and 350. For example, under normal temperate conditions, the temperature of the heat source 200 may be maintained to have a core temperature reading between 45 and 60° F. by cycling the heat exchange system 100 as required while the heat sink 300 maintains a temperature of 140° F. However, during colder winter months in many areas, the increased draw of stored thermal energy from the heat source 200 in order to keep the heat sink 300 at a particular temperature, 140° F. for example, may drop the temperature of the heat source 200 below a threshold temperature, impacting the efficiency of the heat exchange system 100. In particular, the ability for the heat exchange process in the evaporator 140 to function efficiently may be impacted. As such, the water management system 700 may be set to signal the ECU 540 to turn on the heater 220 when the heat source temperature gauge 230 reads a core temperature below 38° F., for example. Under these circumstances, the ECU 540 may be programmed, for example, to continue operation of the heat exchange system 100 until the heater 220 provides enough supplemental thermal energy to the fluid flow to raise the core temperature of the heat source 200 to a preset threshold winter temperature, 45° F. for example.

Another feature in accordance with aspects of the present system may be the inclusion of a supplemental solar heating system 800 to provide yet another source of thermal energy during peak heating demand, such as during the winter months and/or during times of peak hot water demand, for example. As shown in FIG. 7, the supplemental solar heating system 800 may be configured to operate in tandem with either the heat sink 300 or the heat source 200 through a heat exchange process in which solar thermal units convert solar energy into thermal heat energy that is supplied to the fluid flow of the heat exchange system 100. Three way valves 810 and 820 may be provided to control the fluid flow between the solar heating system 800 and either the heat sink 300 or the heat source 200, respectively. The valves 810 and 820 are controlled to operate in tandem so that when the valve 810 shuts off fluid flow in the direction of the heat sink 300 and instead directs the fluid flow to the heat source 200, the valve 820 opens to receive the fluid flow from the heat source 200 and is closed to receiving fluid flow from the heat sink 300. Similarly, when the valve 810 shuts off the fluid flow in the direction of the heat source 200 and instead directs the fluid flow to the heat sink 300, the valve 820 opens to receive the fluid flow from the heat sink 300 and is closed to receiving fluid flow from the heat source 200. In this manner, the heat exchange system 100 may select either the heat sink 300 or the heat source 200 as the beneficiary of the thermal energy produced by the solar thermal units of the supplemental solar heating system 800.

During peak summer months in many areas, for example, where the need for cool air may drive a peak demand on the heat exchange system 100 for chilled water, the water management system 700 may be programmed to maintain the core temperature of the heat source 200 at a lower threshold summer temperature, 38° F. for example. Under these circumstances, the amount of thermal energy drawn from the heat source 200 may raise the core temperature of the heat sink 300 to levels too high for the condenser heat exchange process to function efficiently. To keep the condenser section operating at lower temperatures, the water management system 700 may thus be controlled to open the valve 360 in the direction of the secondary heat sink 350 to direct fluid from the condenser 120 to the larger secondary heat sink 350 rather than the heat sink 300. Concurrently, the water management system 700 is controlled to open the valve 365 to receive fluid from the secondary heat sink 350 rather than from the heat sink 300. In this manner, the secondary heat sink 350 may serve as a large depository of excess thermal energy during peak cooling demand, allowing the system to maintain the core temperature of the heat source 200 at a lower desirable temperature without distressing the efficiency of the system.

Another feature in accordance with aspects of the present invention includes providing a further mechanism for drawing off excess thermal energy in the event that the secondary heat sink 350 also reaches a core temperature considered too elevated for the efficient operation of the condenser 120 of the heat exchange system 100. A pipe or conduit may be provided so that fluid can be pumped from the secondary heat sink 350 to an area where a fan and/or hydronic coils may be used to transfer the excess energy to an ambient air environment external to the structure, for example.

While this invention has been described in conjunction with the exemplary aspects outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope of the invention, including increasing the size of various components, including the heat source and heat sink, to scale the system appropriately for different applications. Therefore, the invention is intended to embrace all known or later-developed alternatives, modifications, variations, improvements, and/or substantial equivalents.

What is claimed is:

1. A modular heat exchange system comprising:
   a refrigerant system which cycles a refrigerant through a compressor, a condenser, an expansion valve, and an evaporator;
   a heat source circulation system which circulates a heat exchange fluid between a heat source and the evaporator;
   a heat sink circulation system which circulates a heat absorption fluid between a heat sink and the condenser;
   a fluid management system comprising:
      a first temperature gauge that determines a core temperature of the heat source,
      a second temperature gauge that determines a core temperature of the heat sink, and
      a controller;
   and
   a separate thermal energy source,
   wherein the controller is configured to transfer thermal energy from the separate thermal energy source to the heat exchange fluid when the core temperature of the heat source falls below a threshold temperature while the core temperature of the heat sink is maintained at a constant temperature,
      wherein the separate thermal energy source is a solar energy thermal unit, and the heat absorption fluid can be cycled through the solar energy thermal unit to maintain the core temperature of the heat sink and the heat exchange fluid can be cycled through the solar energy thermal unit,
      the modular heat exchange system further comprising a first valve, a second valve, and a valve controller configured to operate the first valve and the second valve in tandem to cycle only one of the heat exchange fluid and the heat absorption fluid through the solar energy thermal unit.

2. The modular heat exchange system of claim 1, wherein the refrigerant is R-410A.

3. The modular heat exchange system of claim 1, wherein the heat exchange fluid is water.

4. The modular heat exchange system of claim 1, wherein the heat absorption fluid is water.

5. The modular heat exchange system of claim 1, wherein the heat source circulation system further comprises a fluid flow conduit connecting the heat source to the evaporator.

6. The modular heat exchange system of claim 1, wherein the heat source is a body of water.

7. The modular heat exchange system of claim 5, wherein the body of water is contained in a heat source storage tank.

8. The modular heat exchange system of claim 1, wherein the heat sink is a body of water contained in a heat sink storage tank.

9. The modular heat exchange system of claim 1, wherein the heat sink is one of a primary heat sink or a secondary heat sink.

10. The modular heat exchange system of claim 9, further comprising a first sink valve, a second sink valve, and a sink valve controller wherein the sink valve controller is configured to work the first sink valve and the second sink valve in tandem to cycle the heat absorption fluid to only one of the primary heat sink and the secondary heat sink.

11. The modular heat exchange system of claim 10, wherein the heat absorption fluid is cycled to the secondary heat sink when the core temperature in the primary heat sink determined by the second temperature gauge rises above a threshold temperature while the core temperature of the heat source determined by the first temperature gauge is maintained at a constant temperature.

* * * * *